June 14, 1949. B. HERSHMAN 2,473,249
ANTISKID CROSS STRIP
Filed May 11, 1946
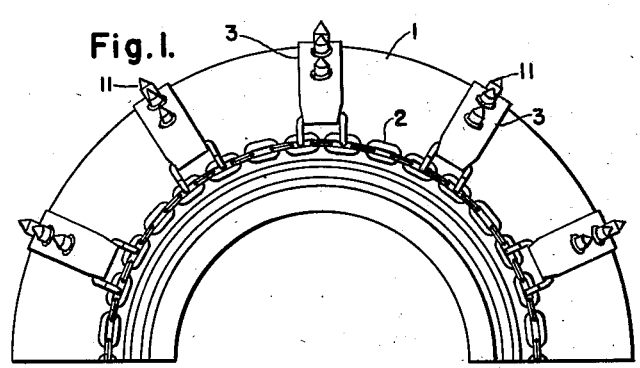
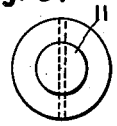
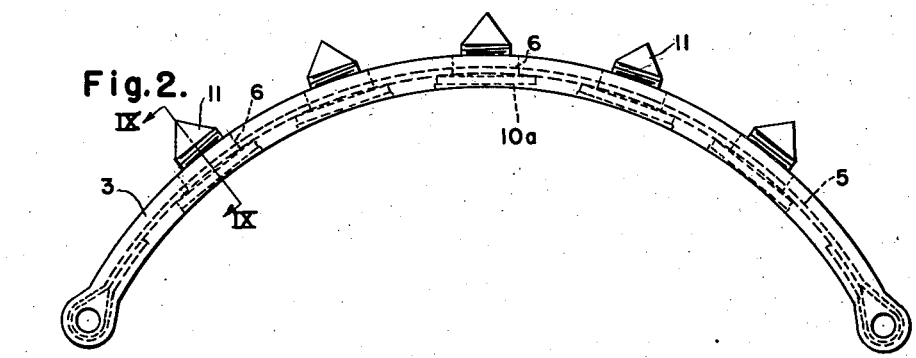
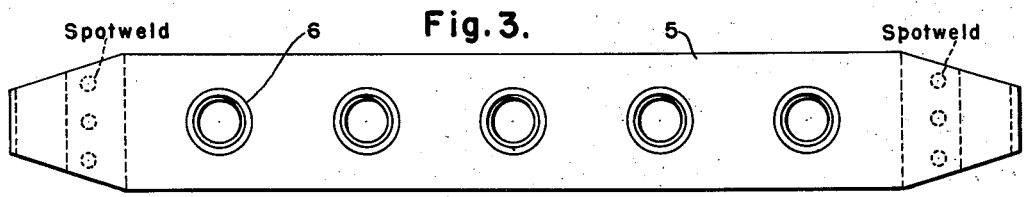
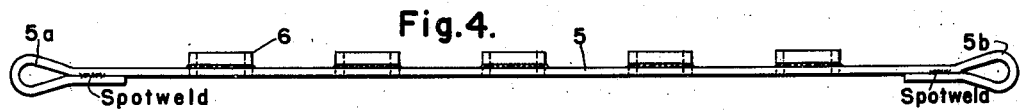
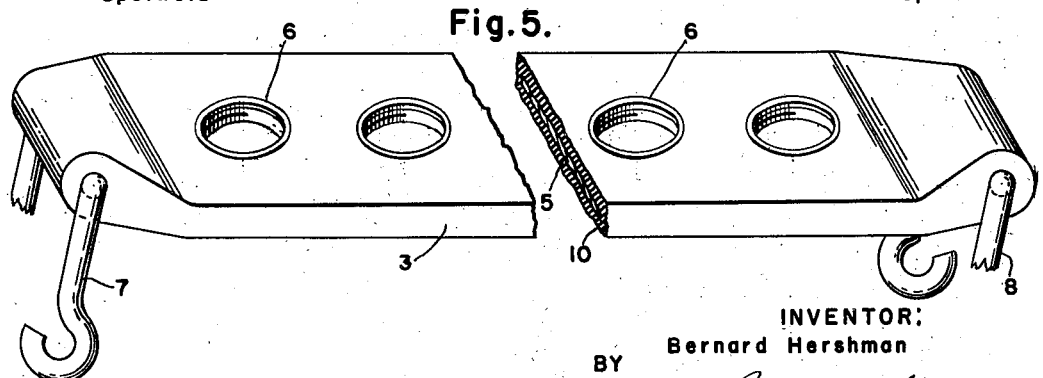
INVENTOR:
Bernard Hershman
BY
Christy, Parmelee & Strickland
ATTORNEYS Patented June 14, 1949

2,473,249

UNITED STATES PATENT OFFICE 2,473,249

ANTISKID CROSS STRIP

Bernard Hershman, Pittsburgh, Pa.

Application May 11, 1946, Serial No. 669,116

3 Claims. (Cl. 152—222)

This invention relates to an anti-skid cross-strip which is particularly useful as a substitute for the ordinary cross-link on an anti-skid chain such as used for automobile and truck vehicles.

An outstanding disadvantage of most of the common types of cross-links in anti-skid chains is that upon wear they are not readily or easily replaceable and generally require special tools for this purpose. Furthermore, it is generally necessary to replace the entire cross-link whereas the only parts that wear and really require replacing are the projecting anti-skid traction elements.

An object of this invention, therefore, is to provide a novel cross-strip that is particularly suitable as a substitute for the ordinary cross-link in an anti-skid chain, which cross-strip is devoid of the above-mentioned disadvantages.

A more specific object of this invention is to provide a novel cross-strip having readily replaceable anti-skid traction elements.

A more specific object of this invention is to provide an anti-skid cross-strip through the thickness of which are screw threaded a plurality of screws having enlarged heads and ends of reduced cross-section, which ends project from the outer face of the cross-strip so as to serve as traction elements and which screws are readily removable and replaceable from the inner face of the cross-strip.

Other objects and advantages of this invention will become apparent from a study of the following specification taken with the accompanying drawing in which:

Figure 1 is a fragmentary side view of a vehicle tire having mounted thereon an anti-skid chain embodying cross-strips involving the principles of this invention;

Figure 2 is an end view of one of the cross-strips shown in Figure 1 shown somewhat enlarged;

Figure 3 is a top view of a thin steel band extending substantially along a median plane of the cross-strip shown in Figure 2;

Figure 4 is a front or elevational view of the band shown in Figure 3;

Figure 5 is a perspective view of the rubber or rubberized casing for enclosing the strip shown in Figures 3 and 4 and including screw threaded eyelets as well as hooks;

Figure 6 is an end view of a screw having a conically tapered end;

Figure 7 is a side view of the screw shown in Figure 6;

Figure 8 is a top view of a screw threaded eyelet or bushing, and

Figure 9 is a cross-sectional view taken along line IX—IX of Figure 2 showing how the eyelet of Figure 8 is spot welded or otherwise secured to the steel strip and showing how the screws of Figures 6–7 fit into the strip and casing.

Referring more particularly to Figure 1 of the drawing, numeral 1 denotes a tire for a vehicle, such as an automobile or truck, having mounted thereon an anti-skid chain 2 including a plurality of cross-strips such as 3. Each of the cross-strips, such as 3 and as shown more clearly in Figure 2, comprises a thin band 5, preferably of spring steel or other suitable material, having a plurality of holes extending therethrough with which holes a plurality of eyelets or bushings such as 6 are in registry. The bushings or eyelets 6 are internally screw threaded and are spot welded or otherwise secured to the steel band 5 so as to form an integral structure. The ends 5a and 5b of band 5 are looped and spot welded as well as tapered so as to provide openings for accommodating hooks, such as 7 and 8 shown in Figure 5, which hooks attach the cross-strip to the tire chain in the same manner as the ordinary cross-link as well-known in the art. Band 5, as shown more clearly in Figures 2 and 5, is completely encased in a rubber or rubberized fabric casing 10, or in fact, any casing of suitably flexible and durable material. As will be noted from the drawing, the casing may enclose the entire looped ends 5a and 5b of the band although, if desired, such ends may be exposed. The rubber has holes which are in registry with the internally screw threaded eyelets or bushings 6.

Bushings 6 are made of steel or other suitable material. As will appear more clearly in Figure 9, the plurality of holes have portions adjacent the inner face of casing 10 which are counter-bored as shown at 10a so as to provide wells or pockets into which may be fitted the head portions of screws or studs such as 11. A plurality of screws such as 11 are provided, each being screw threaded into one of the eyelets or internally threaded bushings so that the head portion will become seated in the well at the inner face of the cross-band, and the end portion will project above the outer face of the cross-band, which end portion is preferably of reduced diameter or conically pointed, as shown, so that the screws effectively serve as anti-skid traction elements by frictionally engaging the roadway surface. The screws are preferably of steel, and at least the tapered ends thereof are preferably case hardened to 500 Brinell or other suitable hardness to minimize wear.

In operation, it will be readily seen that when the tapered ends of the screws are worn away after prolonged frictional rubbing on the roadway surface, they may be readily replaced merely by inserting a screwdriver in the kerfs, such as $11a$ of screw $11$, from the inner face of the cross-band, that is, the tire-bearing surface of the cross-band and may be replaced by other similar new screws. In this manner, it is only necessary to replace the screws, or gripping elements, alone, instead of the entire cross-link or cross-band structure. Furthermore, the manner of connection of the screws or anti-skid traction elements to the cross-band is of such character as to permit quick and easy unscrewing of these screws and replacement by new screws, such replacement being made possible by the ordinary screwdriver instead of by a special tool and requiring no dismantling of any of the parts of the cross-strip. Furthermore, by having the heads of the screws seated, as shown, there is no danger of their falling off due to loosening of the screws.

While the above invention has been described in connection with a cross-link for an anti-skid chain, it is equally suitable in any structure where an anti-skid surface is desirable, and while specific materials have been indicated, it will be readily apparent that other similar materials may be substituted if desired.

While I have illustrated and described certain specific embodiments of my invention, it will be understood that this is by way of illustration only and that various changes and modifications may be made within the contemplation of my invention and within the scope of the following claims.

I claim:

1. A cross-strip for an anti-skid chain for a vehicle tire comprising a flexible metallic band having a plurality of internally threaded bushings extending therethrough and integrally formed with the band, a coating of flexible material on both surfaces of said band and having apertures registering with said bushings which apertures are counterbored adjacent the tire-bearing surface of said flexible material, a plurality of screw threaded studs screw threaded to said bushings and having head portions fitting into the counterbored portions and having end portions of progressively reduced cross-section compared to the shanks of the studs extending above the opposite surface of said flexible material.

2. An anti-skid chain for a vehicle tire comprising a plurality of cross-strips, each comprising a flexible steel band embedded in a rubber containing casing forming a composite strip, a plurality of apertures extending through the thickness of said strip and including counterbored portions adjacent the tire-bearing surface of said casing, a plurality of internally screw threaded bushings registering with said aperture and integrally formed with said steel band, a plurality of screws screw threaded into said bushings, and having head portions seated in said counterbored portions and having end portions projecting above the surface of the roadway-bearing surface of said casing thereby serving as anti-skidding traction elements.

3. An anti-skid chain for a vehicle tire comprising a plurality of cross-strips, each comprising a flexible steel band embedded in a rubber casing forming a composite strip and having looped end portions serving as chain-fastening eyelets, a plurality of apertures extending through the thickness of said strip and including counterbored portions adjacent the tire-bearing surface of said casing, a plurality of internally screw threaded bushings registering with said aperture and integrally formed with said steel band, a plurality of screws screw threaded into said bushings and having head portions seated in said counterbored portions and having end portions projecting above the surface of the roadway-bearing surface of said casing thereby serving as anti-skidding traction elements.

BERNARD HERSHMAN.

REFERENCES CITED

The following references are of record in the file of this patent:

UNITED STATES PATENTS

| Number | Name | Date |
| --- | --- | --- |
| 1,615,154 | Anderson | Jan. 18, 1927 |
| 1,824,525 | Ames | Sept. 22, 1931 |